United States Patent [19]

Wilson, II et al.

[11] 4,393,565
[45] Jul. 19, 1983

[54] METHOD OF MAKING A WATER-COOLED ELECTRODE HOLDER

[75] Inventors: James G. Wilson, II, Huntington; P. Fred Hammers, Barboursville, both of W. Va.

[73] Assignee: Wilson Welding Company, Inc., Huntington, W. Va.

[21] Appl. No.: 272,888

[22] Filed: Jun. 12, 1981

Related U.S. Application Data

[62] Division of Ser. No. 148,290, May 9, 1980, Pat. No. 4,342,878.

[51] Int. Cl.³ .................. B23P 15/26; H05B 7/105
[52] U.S. Cl. .................. 29/157.3 R; 29/558; 29/423
[58] Field of Search ....... 29/157 R, 157.3 R, 163.5 R, 29/557, 558, 423, 157 C; 72/324; 165/168, 169; 373/94

[56] References Cited

U.S. PATENT DOCUMENTS

| | | | |
|---|---|---|---|
| 1,621,742 | 3/1927 | Kessler | 165/168 |
| 1,790,114 | 1/1931 | Schranz | 29/157.3 R |
| 1,842,209 | 1/1932 | Schranz | 165/169 |
| 1,884,612 | 10/1932 | Dinzl | 165/168 |
| 1,929,824 | 10/1933 | Polley | 29/157.3 R |
| 2,699,325 | 1/1955 | Hedin | 165/168 |
| 2,884,475 | 4/1959 | Foyn | 373/100 |
| 2,983,994 | 5/1961 | Johnson | 29/423 |
| 3,026,605 | 3/1962 | Turner | 29/156.8 H |
| 3,230,613 | 1/1966 | Rechin et al. | 29/423 |
| 3,334,170 | 8/1967 | Turner | 373/101 |
| 3,343,250 | 9/1967 | Berto et al. | 29/157.3 R |
| 3,354,255 | 11/1967 | Archinal et al. | 373/101 |
| 3,478,192 | 11/1969 | Fink | 219/243 |
| 3,509,261 | 4/1970 | Phillips | 373/99 |
| 3,676,642 | 7/1972 | Rosen et al. | 219/301 |
| 3,876,149 | 4/1975 | Futerko | 29/558 |
| 4,110,548 | 8/1978 | Dresch et al. | 373/99 |

FOREIGN PATENT DOCUMENTS

| | | | |
|---|---|---|---|
| 437665 | 11/1926 | Fed. Rep. of Germany | 165/168 |
| 675395 | 2/1930 | France | 165/168 |
| 169992 | 1/1960 | Sweden | 165/168 |
| 686566 | 1/1953 | United Kingdom | 165/168 |

*Primary Examiner*—Daniel C. Crane
*Attorney, Agent, or Firm*—Young & Thompson

[57] ABSTRACT

A water-cooled electrode holder for use in electric furnaces, comprising a base and a bowl secured to the base for encompassing and supporting a vertical cylindrical electrode, is formed by rolling from a thick copper sheet which has first been drilled with a plurality of intersecting deep holes. The plate is drilled when flat and then bent to horseshoe configuration, the holes being filld with sand to keep their shape during bending. Plugs are then inserted to block the intersections of certain of the holes but to leave a single circuitous passageway through the bowl, for the passage of cooling water.

4 Claims, 8 Drawing Figures

METHOD OF MAKING A WATER-COOLED ELECTRODE HOLDER

This is a division of application Ser. No. 148,290, filed May 9, 1980 now U.S. Pat. No. 4,342,878.

BACKGROUND OF THE INVENTION

Electric arc furnaces are characterized by three electrodes immersed in the molten metal. Each electrode has a holder which in the past has often been in the form of a copper casting, with cooling coils embedded in the casting. Copper is employed because of its low electrical resistivity and high heat conductivity. The cooling coils have generally been fabricated from steel, copper and/or Monel. The coils are placed in a casting mold and then the copper is cast around the cooling coils. However, the cast copper does not bond itself to the coils; and so there remains a small air space between the coils and the copper casting. This space, along with the coil material itself, impedes the flow of heat between the casting and the water, and so the cooling of such holders has been inadequate and their current rating and life expectancy have been correspondingly unsatisfactory.

It is known to make such bowls from a single copper slab milled with water passageways in its surface. These passageways are then closed by strips welded over the passageways. An example of this construction is shown in U.S. Pat. No. 4,110,548, the disclosure of which is incorporated herein by reference.

However, the construction shown in that patent has a number of disadvantages. In the first place, the plate has to be pre-heated and subjected to a welding opertion to apply the closure strips. Each weld thus provided, generates a region of weakness which also has undesirable electrical and thermal properties. Moreover, the welds often leak due to the metallurgical change that has taken place during preheating and welding of the strips. This metallurgical change results in grain growth and grain boundary movement; and failure tends to be encountered due to creep, fracture and fatigue.

As the channels or passageways in the construction of that patent are formed by milling, they are rectangular in cross-sectional configuration. Accordingly, cracks tend to form at the corners. Furthermore, an undesirably large quantity of material must be removed from the patented construction, which lowers the impact strength of such a design. Still further, the patented design has an undesirably high electrical resistivity.

Still further, the construction of that patent suffers in that the thickness of the walls of the passageway on the outer side thereof is undesirably small. The water passageways accordingly are not well protected from the arcing that frequently occurs between closely spaced electrode holders in an electric arc furnace.

Finally, the rectangular configuration of the water passages in the construction of that patent, does not provide uniform heat exchange between the water and the metal through which it flows.

It is accordingly an object of the present invention to provide a method for making an electrode holder of the type described, which will result in a holder having improved heat exchange characteristics between the cooling water and the metal through which it flows.

Another object of the present invention is the provision of a method for making such an electrode holder, which will be metallurgically homogeneous.

Still another object of the present invention is the provision of a method for making such an electrode holder, which will be strong and leakproof.

It is also an object of the present invention to provide a method of making such an electrode holder, which will have relatively low electrical resistivity.

Finally, it is an object of the present invention to provide a method for making such an electrode holer, which will be simple and easy to practice with dependable results.

SUMMARY OF THE INVENTION

The above objects are achieved, by providing a method of making an electrode holder having a bowl which is initially a flat slab of metal and is deep drilled with a plurality of intersecting holes disposed at right angles to each other. The holes are then filled with sand and plugged and the slab is bent to the shape of a horseshoe. With the sand removed, plugs are secured in the holes adjacent certain intersections and in the ends of all but two of the holes, in order to leave a single circuitous passageway for water through the holder, from an inlet to an outlet disposed in an edge of the holder.

BRIEF DESCRIPTION OF THE DRAWINGS

These and other objects, features and advantages of the present invention will become apparent from a consideration of the following description, taken in connection with the accompanying drawings, in which.

Figure 1:
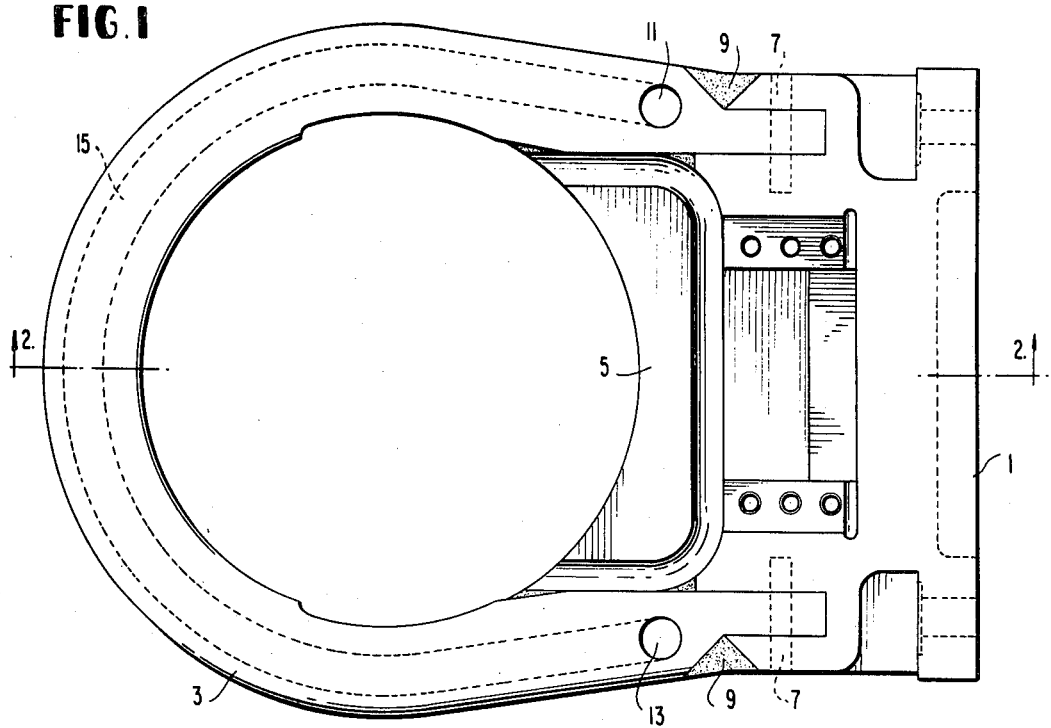
FIG. 1 is a top plan view of an electrode holder made by a method according to the present invention.
Figure 2:
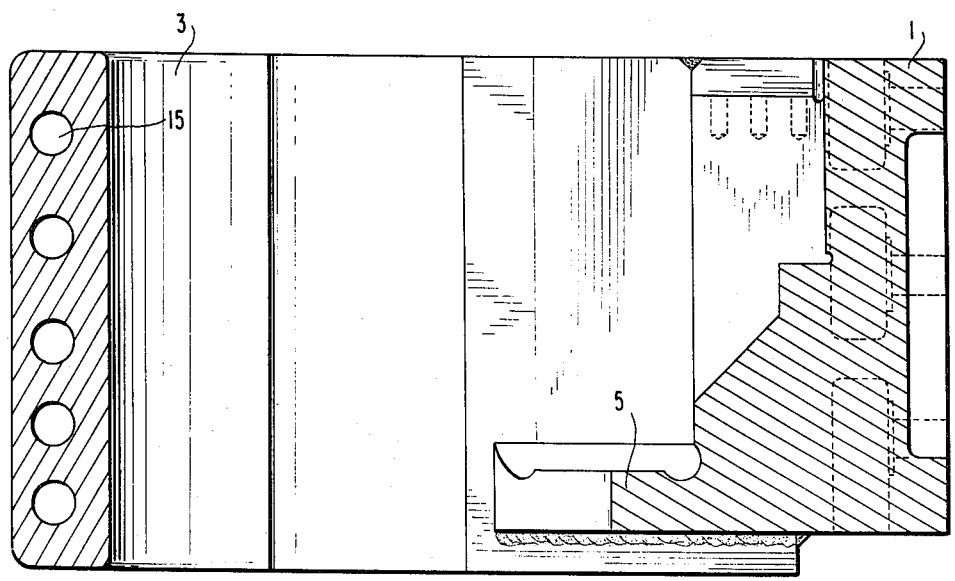
FIG. 2 is a cross-sectional view taken on the line 2—2 of FIG. 1.

Referring now to the drawings in greater detail, and first to FIGS. 1 and 2, there is shown an electrode holder, for example for use in electric arc furnaces, and adapted to be made according to the method to te present invention, comprising a base 1 and a bowl 3, base 1 including a clamping portion 5 which, with an opposed portion of bowl 3, encompasses and supports a vertical cylindrical graphite electrode (not shown) in the usual way. Base 1 and bowl 3 are interconnected by pins 7 and welds 9.

As described thus far, the electrode holder can be conventional and the usual construction of base 1 and clamping portion 5 can be employed, the details of which can be gathered from the above-identified patent or any of the other patents in this field and so need not be described in greater detail herein.

The present invention is concerned entirely with the method of fabrication of the bowl 3. Bowl 3 is provided with an inlet 11 and an outlet 13 for cooling water that enters and leaves through the usual connections (not shown) and which passes from inlet 11 to outlet 13 through a circuitous passageway 15 within bowl 3.

Passageway 15 is characterized in that its cross-sectional configuration is circular and in that it is comprised by a number of arcuate or horseshoe shaped portions interconnected at their ends by short vertical sections aligned with inlet 11 and outlet 13.

The method of making the bowl 3 will now be described, following FIGS. 3–8 in that order.

The fabrication begins with a flat rolled copper plate or slab 17. Because it is rolled, it is metallurgically sound and the grain structure is of desirable orientation for the purposes of the present invention. In the course of fabrication, we do as little as possible, to change these desirable characteristics with which we begin; and this is why we produce a final product of desirably improved characteristics.

Figure 3:
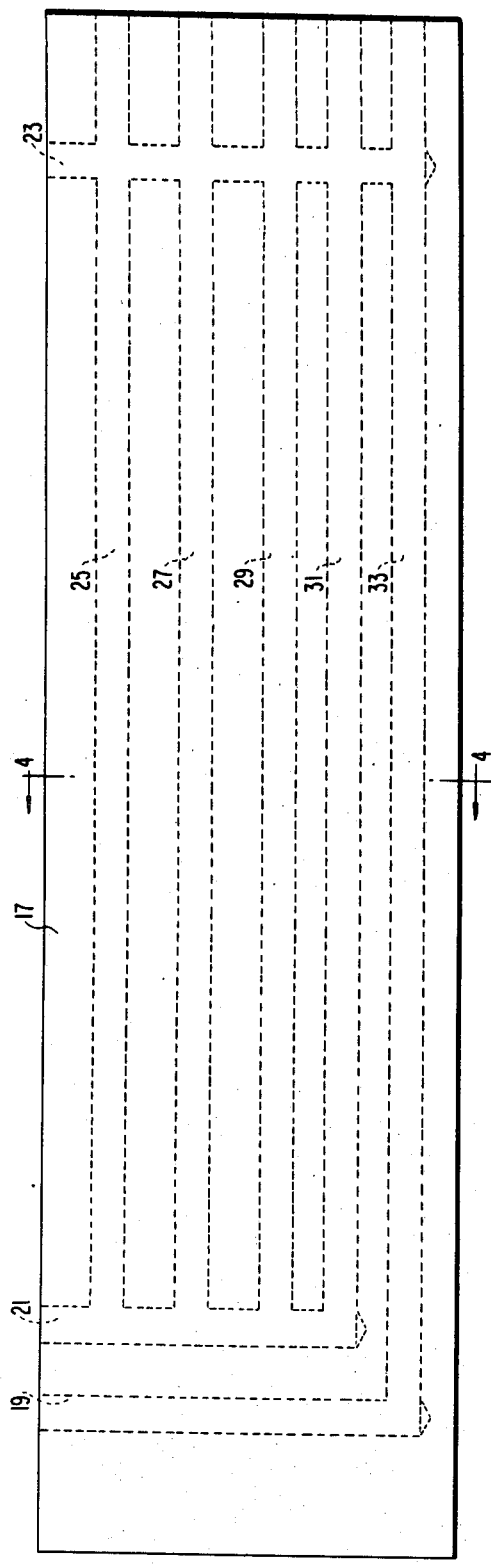
FIG. 3 is a view of a flat metal slab or plate which has been drilled with a plurality of holes.

Slab 17 is a rather massive piece, typical dimensions of which are, for example, 25 inches wide, 91 inches long and 5 inches thick. We then deep drill the slab, with three holes 19, 21 and 23 as best seen in FIG. 3, edgewise inwardly from and perpendicular to one of the longer edges of the slab, the holes 19 and 23 being of greater depth than hole 21.

We then drill lengthwise of the slab, through one of the shorter edges of the slab, a plurality of holes 25, 27, 29, 31 and 33, perpendicular to holes 19, 21 and 23 and parallel to the longer edges of the slab, the holes 25–31 intersecting holes 21 and 23 but terminating in hole 21, the hole 33 being longer than holes 25–31 and intersecting holes 19 and 23, but not hole 21, and terminating in hole 19. Notice that holes 19–33 are of circular cross section. It is also to be noted that they can be disposed in slab 17 at any desired spacing from the major faces of the slab, because the slab on all sides of each hole is integral and there is no need to close any of the holes laterally. The thermal and electrical characteristics of the completed bowl can thus to some extent be predetermined by appropriate selection of the position of the holes. A typical hole diameter is two inches.

Figure 5:
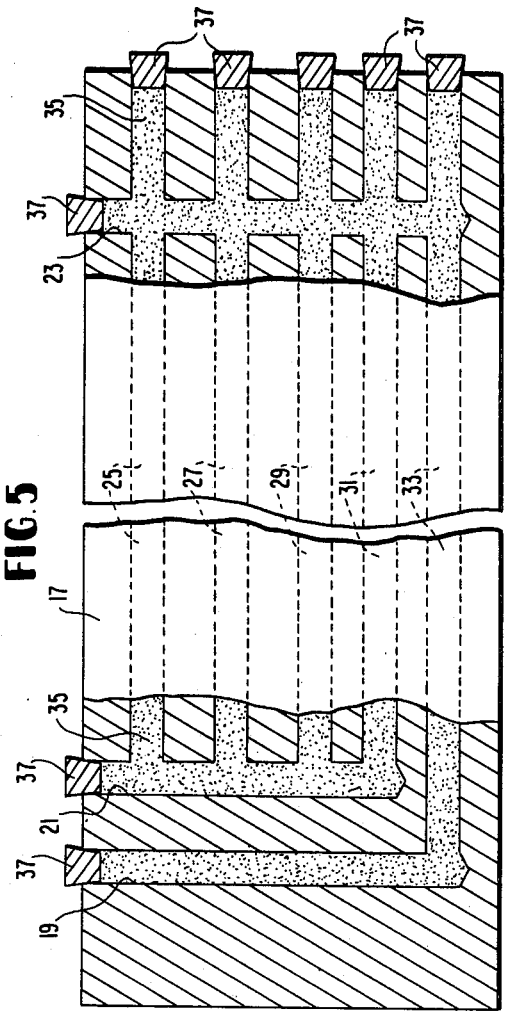
FIG. 5 is a fragmentary view similar to FIG. 3, with parts broken away, showing the packing of the holes prior to bending of the slab.
Figure 4:
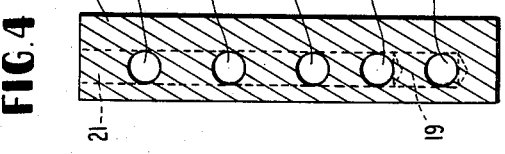
FIG. 4 is a cross-sectional view taken on the line 4—4 of FIG. 3.

The next major step in the fabrication of the bowl, is to bend it to horseshoe shape; but first, it is necessary to ensure that the holes will not flatten during such bending. To this end, we fill the holes with sand 35; and then we plug the ends of all the holes with copper plugs 37, as seen in FIG. 5.

Figure 6:
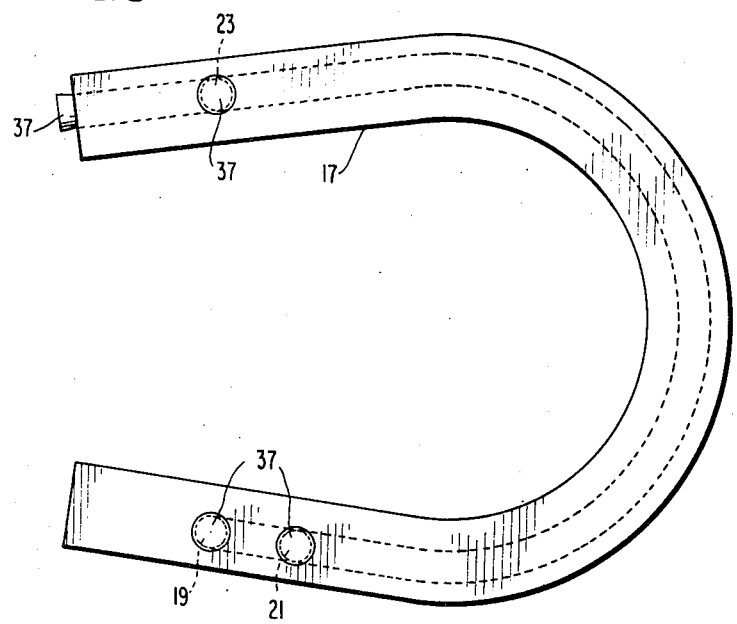
FIG. 6 is a top plan view of the bent slab.

We then bend or roll the slab 17 to U-shape, more particularly to the horseshoe configuration shown in FIG. 6, after which we remove plugs 37 and sand 35.

In the next step of fabrication of the bowl, we interrupt the passageways provided by the drilled holes, at selected points, thereby to form the single circuitous passageway 15. We bent slab 17 only in one plane; and so the holes 21 and 23 have remained straight. Also, because we bent to horseshoe configuration, the ends of the horseshoe remain straight and so the exit ends of the holes 25–33 remain straight because they are in a straight or unbent portion of the bowl.

Figure 7:
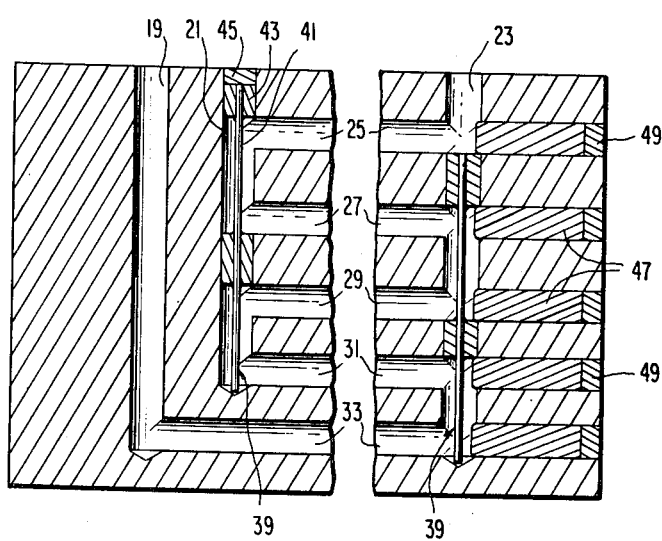
FIG. 7 is a view similar to FIG. 5, except that the slab is now bent and the packing has been removed and the plugs have been inserted.
Figure 8:
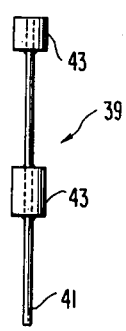
FIG. 8 is a view of an individual stemmed plug comprising a part of the assembly shown in FIG. 7.

We take advantage of having maintained these holes and portions of holes straight, in the manner shown in FIGS. 7 and 8. Specifically, in the holes 21 and 23, we insert stemmed plugs 39 as shown separately in FIG. 8. As will be seen from FIG. 8, each stemmed plug 39 comprises a straight stem 41 of relatively small diameter, of copper rod, with copper plugs 43 silver-brazed thereon at spaced intervals. In hole 21, stemmed plug 39 rests on the lower end of its stem 41 adjacent the intersection of holes 21 and 31, stem 41 being of sufficiently small diameter as not to occupy any substantial portion of the cross-sectional area of hole 21. However, the upper plug 43 closes the exit end of hole 21; while the lower plug 43 seen at the left of FIG. 7 closes the hole 21 between holes 27 and 29. Holes 25 and 27 communicate with each other, however, through hole 21 past stem 41; and similarly, holes 29 and 31 communicate with each other through hole 21 past stem 41. Plugs 43 are force-fitted in their respective portions of hole 21; and stemmed plug 39 is then welded in place at 45.

Turning now to the right of FIG. 7, it will be seen that another stemmed plug 39 is inserted in hole 23, but to a greater depth than the stemmed plug that was inserted in hole 41. Thus, at the right of FIG. 7, the stemmed plug 39 rests on the lower end of its stem at the intersection of holes 23 and 33; and the two plugs 43 separate the holes 25 and 27 on the one hand, and 29 and 31 on the other hand, by blocking the corresponding portions of hole 23. Of course, the axial length of the plugs 43 may not be exactly the same for the stemmed plugs 39 at the left and at the right of FIG. 7, that is, in the holes 21 and 23, respectively.

The force-fitting of the plugs 43 in the holes 21 and 23 is effective to prevent any substantial flow of water past the plugs but does not really perform an important part of the function of securing the stemmed plugs 39 in their respective holes. Instead, as previously mentioned, the weld 45 retains the stemmed plug 39 in hole 21; but in hole 23, an entirely different structure maintains the stemmed plug 39 in place. Specifically, the open ends of the holes 25–33 are closed by metal plugs 47 which are held in place by welds 49. Welds 45 and 49 are flush with their respective surfaces of slab 17. Moreover, the inner ends of plugs 47 protrude slightly into hole 23; and so the plugs 47 perform the unique dual function, both of closing the ends of holes 25–33, and also of holding the plugs 43 in place in hole 23. Specifically, the plugs 27 in holes 25 and 27 are disposed immediately above and below the plug 43 that interrupts communication between holes 25 and 27 through hole 23; while the plugs 49 in holes 29 and 31 are disposed immediately above and below the plug 39 that interrupts communication between holes 29 and 31 through hole 23; and the associated ends of the plugs 49 thus ensure that stemmed plug 39 as a whole will be held in the proper position in hole 23.

The plugs 43 thus ensure that there will be a single continuous circuitous water passageway 15 through bowl 3, from inlet 11 through holes 19 and 33, thence up through the lower end of hole 23 to hole 31 and in the reverse direction the length of hole 31 to hole 21, up through that portion of hole 21 to hole 29 whence the water passes again in reverse direction the length of hole 29 to hole 23, up through hole 23 to hole 27 and in the reverse direction the length of hole 27 to hole 21, up through hole 21 to hole 25 and in the reverse direction the length of hole 25 to the upper end of hole 23, and thence out through outlet 13.

We have thus provided a method of making an electrode holder whose bowl provides very great heat exchange between the water and the metal, by virtue of the circular cross-sectional configuration of the water passageway. This circular cross-sectional configuration also avoids the formation of cracks. The bowl of our holder, made by the method of the present invention, has improved mechanical, thermal, electrical and chemical properties; and the good metallurgical properties originally imparted to the plate by rolling have not been substantially altered during manufacture of the bowl. Our holder is not subject to leaks, creep, fracture or fatigue and has relatively low electrical resistivity. It resists very well any arcing between adjacent holders in electric furnace practice and resists very well the mechanical stress and heavy electrical loading which produce expansion and contraction of the bowl. Finally, we have done all this by means of a method of fabrication that is relatively easy and inexpensive to practice.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. A method of making an electrode holder of the type comprising a U-shaped slab of metal with a circuitous passageway therethrough for the flow of cooling water, comprising blind drilling a plurality of straight holes at right angles to each other through two adjacent edges of a flat slab of metal with a plurality of said holes intersecting each other, bending said flat slab to U-shape in a direction such that the holes extending in one direction are bent to U-shape but the holes at right angles thereto remain straight and to an extent such that the legs of the U-shaped slab remain flat so that portions of the holes bent in a U-shape form straight passages, plugging the ends of said straight passages, and plugging certain of said holes that remain straight intermediate their length between certain adjacent U-shaped holes, in such a pattern as to leave a single circuitous passageway through the slab having an inlet end and an outlet end opening edgewise through the slab.

2. A method as claimed in claim 1, and inserting plugs in certain of said holes intermediate the length of the holes, by mounting the plugs on a relatively slender central stem, said stem being centrally located on the plugs, inserting the stem-mounted plugs in certain of said holes intermediate the length of the holes and resting a stem end against the bottom of the hole to be plugged thereby properly positioning the plug in the hole between two holes that are at right angles to the hole in which the stem is disposed.

3. A method as claimed in claim 2, and positioning certain others of said plugs that close the ends of said straight passages, on opposite sides of a plug on a said stem thereby to hold the stemmed plug in position in its associated said hole.

4. A method as claimed in claim 1, in which the slab is elongated and is bent in a direction such that said holes that remain straight are parallel to the shorter edges of the slab.

* * * * *